United States Patent [19]

Kjellberg

[11] 4,324,520

[45] Apr. 13, 1982

[54] METHOD OF LAYING-OUT SPACING STICKS, AND APPARATUS FOR CARRYING OUT THE METHOD

[76] Inventor: Jan E. Kjellberg, Norra Bäckvägen 40, 821 00 Bollnäs, Sweden

[21] Appl. No.: 112,256

[22] Filed: Jan. 15, 1980

[30] Foreign Application Priority Data

Jan. 17, 1979 [SE] Sweden .................. 7900439

[51] Int. Cl.³ .............................................. B65G 57/18
[52] U.S. Cl. ........................................ 414/42; 414/82; 414/128; 414/786
[58] Field of Search ..................... 414/32, 42, 60, 76, 414/82, 83, 85, 98, 99, 128, 786

[56] References Cited

U.S. PATENT DOCUMENTS

| 310,232 | 1/1885 | Smith | 414/42 |
| 1,705,570 | 3/1929 | Horstkotte | 414/32 |
| 2,928,559 | 3/1960 | Mosely | 414/42 X |

FOREIGN PATENT DOCUMENTS

2524989 12/1976 Fed. Rep. of Germany ........ 414/42

*Primary Examiner*—Robert W. Saifer
*Attorney, Agent, or Firm*—Sughrue, Mion, Zinn, Macpeak and Seas

[57] ABSTRACT

When depositing layers of lumber (19) onto a support surface to form a stack (17) of lumber, spacing sticks (2) are placed between the various layers at right angles to their longitudinal direction. One or more laying means (20), which carry the layers of lumber, move either continuously or intermittently towards, over, and away from said stack support surface (21) on which the layers of lumber are placed. The spacing sticks (2,2') are inserted between separate layers of lumber by means of a movable means (13) which, while engaging one end of respective sticks, feeds said sticks substantially parallel with the direction of return movement of the laying means (20). The problem of laying the layers of lumber and the spacing sticks in a manner such that they interfere with one another to the least possible extent is hereby solved in a simple and reliable manner. Preferably the engaging means feeds the spacing sticks separately from an overlaying magazine (1) and maintains engagement with respective spacing sticks until said means has reached a remote turn position, at which the spacing stick is deposited onto the stack support surface or onto a partly formed stack, or to a preferably pivotable spacing-stick guide means (18) arranged on the opposite side of the stack support surface. The invention also relates to a spacing stick laying means arranged adjacent a stack support surface (21) for receiving layers of lumber (19). The said spacing stick laying means is arranged to operate in the aforedescribed manner. To this end, the spacing stick laying means comprises means in the form of a clamping arm (13) having a spring-loaded jaw means (14) which, while engaging one end of a spacing stick (2), supports said stick in a free-bearing manner during said feed movement.

11 Claims, 7 Drawing Figures

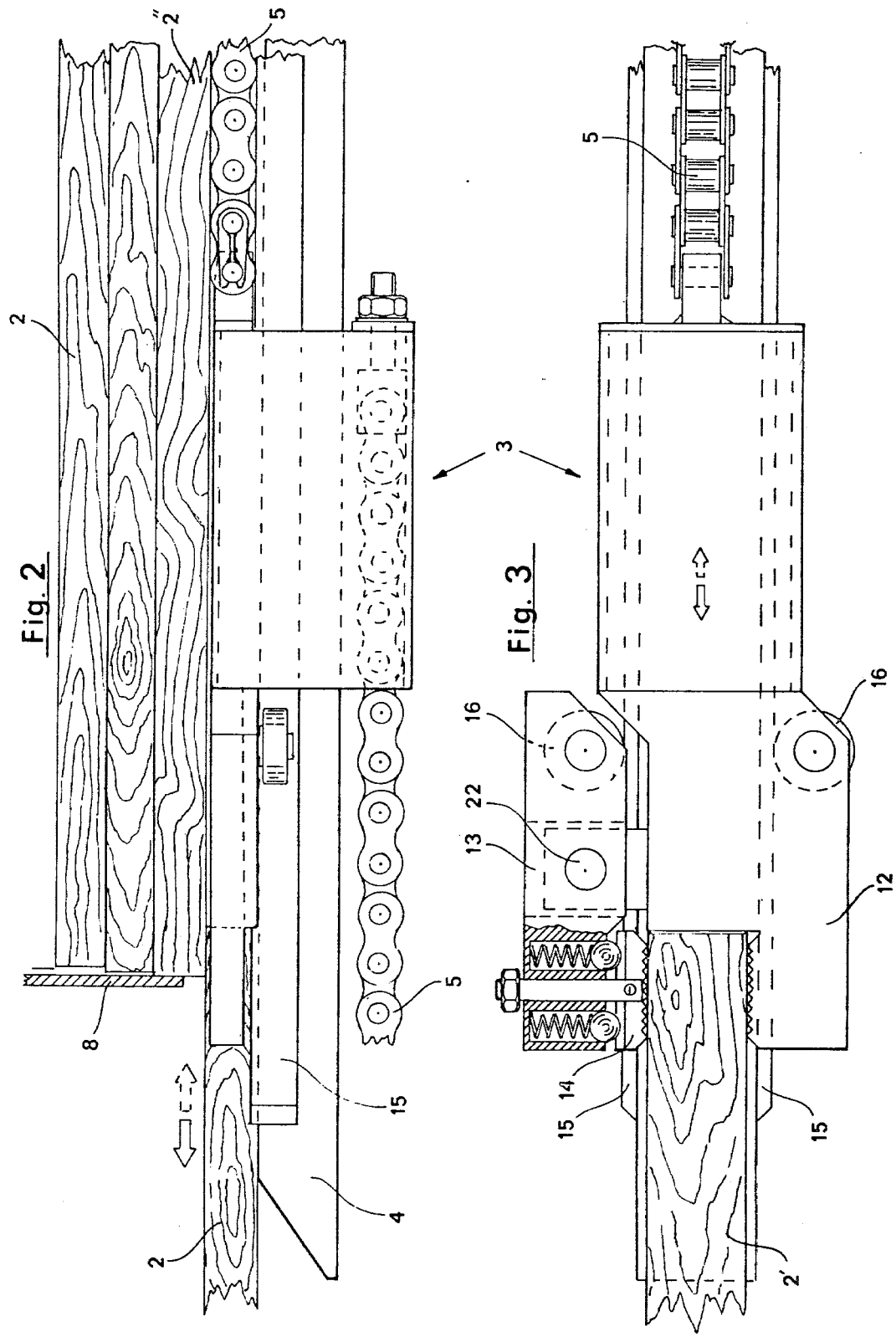

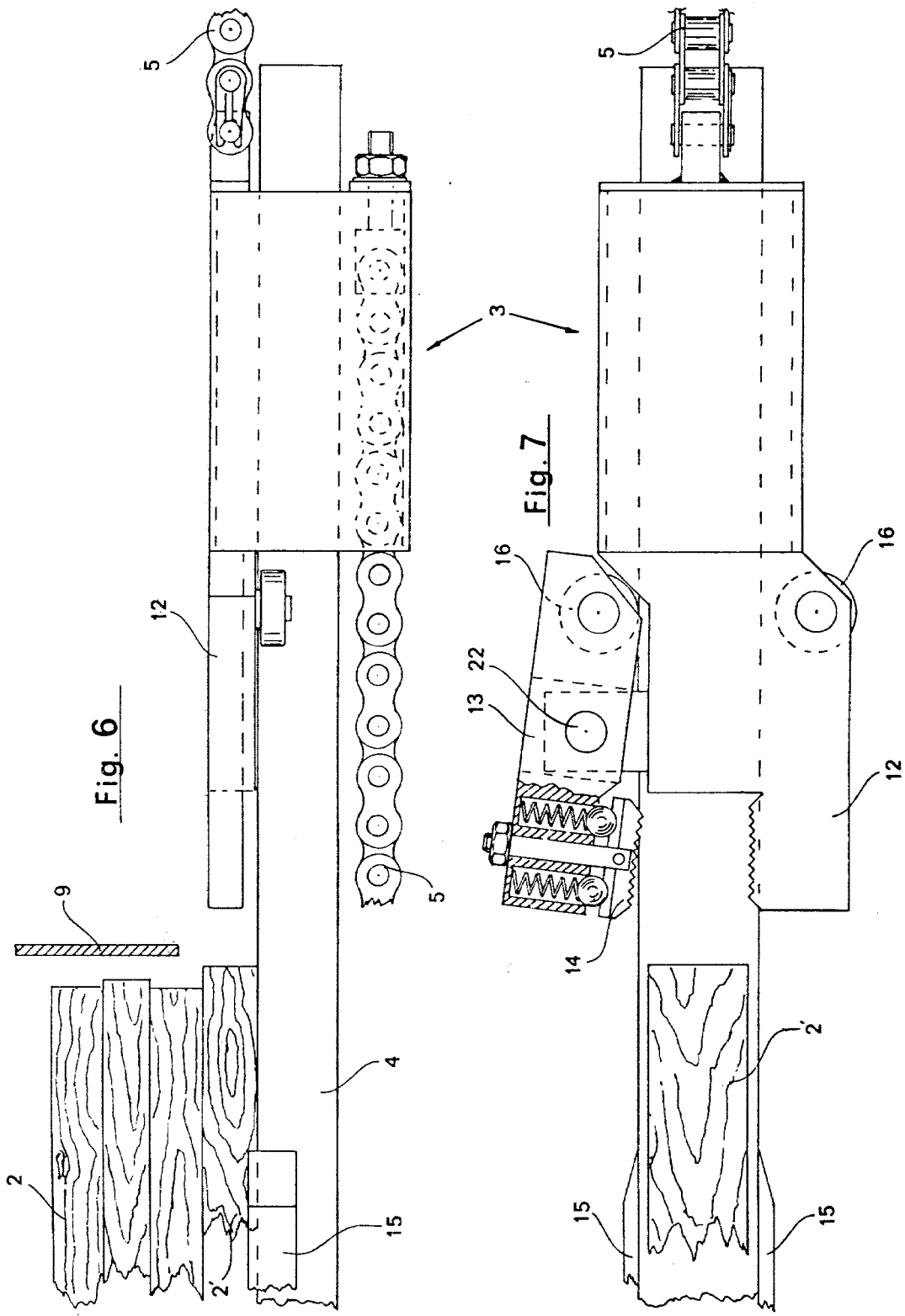

METHOD OF LAYING-OUT SPACING STICKS, AND APPARATUS FOR CARRYING OUT THE METHOD

The present invention relates to a method in the forming of layers of timber to build a timber stack of inserting spacing sticks between the various layers of timber at right angles to the longitudinal axis of said timber, one or more laying means which support the layers of timber being arranged to move either continuously or discontinuously towards, over, and away from a stack-support surface on which the layers of timber are placed, and spacing sticks being inserted between separate layers of timber by means of a movable device which feeds said spacing sticks substantially parallel to the direction of return movement of said laying means. Differing types of apparatus for inserting spacing sticks between various layers of timber transversely of the longitudinal axis of the sticks are known to the art. These apparatus are often bulky and complicated in operation, particularly in those cases where a plurality of mutually parallel spacing sticks are to be laid out along the length of the timber layer. Normally, it is not possible to provide common drive means for a plurality of simultaneously working stick-laying apparatus. Examples of such known apparatus are found in U.S. Pat. No. 2,928,559 and German Lay-out Print No. 2.544.897.

Another disadvantage encountered with known spacing-stick laying apparatus is that the time taken to form a layer of timber is extended by the fact that the outfeed of a timber layer must be interrupted in order for the spacing sticks to be placed in the desired positions. Consequently, such apparatus cannot normally be used together with a continuously moving spacing-stick laying device.

A further disadvantage with known spacing-stick laying apparatus is that they can normally only be used together with certain types of timber-layer laying means. Thus, this leads to complications when it is desired to provide a specific type of stack laying means, for example one having continuously moving laying arms, with a known spacing-stick laying apparatus.

An object of the present invention is to provide a method of the aforedescribed kind with which the disadvantages encountered with known spacing-stick laying apparatus are avoided and which provides a simplified laying method which is simple to apply even with existing stack laying means, irrespective of whether it has continuously moving or intermittently moving laying means.

In its widest aspect the invention is mainly characterized in that the movable means is caused to engage one end of a spacing stick and to feed said stick towards said stack support surface substantially simultaneously with the forward and/or rearward movements of the laying means in a manner such that the spacing sticks and the lumber layers during at least part of the stacking sequence execute mutually opposite relative movements at differing levels and out of contact with one another.

Because the engaging means engages one end of a spacing stick and moves in the manner described, the laying of said spacing sticks can be effected in the form of a movement which enables the feeding and release of a spacing stick to be accurately controlled substantially irrespective of movement made by the stacking means and the manner in which a layer of lumber is deposited therefrom, wherewith the laying of said spacing sticks is substantially completely independent of the type of stacking means used. Thus, the spacing sticks can be laid without complications, irrespective of whether the stacking means is provided with a laying arm which executes a given continuous reciprocating movement and, for example, delivers the layer of lumber while stopping above the stack support surface, or whether the stacking means comprises one or more continuously movable arms which deposit the layer of lumber by co-operation with a stripper or doctor blade arranged at one end of the stack support surface.

Spacing sticks can be contained in cassettes provided with front and rear defining walls, said engaging means being arranged to engage the lowermost spacing stick of respective cassettes.

In practice, it is preferred that while the engaging means is being fed in, the spacing sticks are held free-bearing substantially parallel with the feed direction.

A plurality of spacing stick laying means can be arranged in mutual parallel spaced relationship and, if so desired, can be driven by means of a common drive source, for example by means of one or more shafts which extend parallel with the longitudinal axes of the layers of lumber.

Each of said spacing stick laying means has a small width, such that spaces are formed therebetween, thereby enabling personnel, if necessary, to approach the layers of lumber and correct any faults in the stacking of the lumber.

In accordance with a preferred embodiment of the invention, the spacing sticks are inserted under respective layers of lumber substantially simultaneously as said layer is moved back in a direction opposite to that travelled by said sticks.

As indicated above, the stick laying means can be arranged to feed separate spacing sticks from an overlying magazine, said engaging means being arranged to maintain engagement with respective spacing sticks until said engaging means has reached a remote turn position, where said spacing stick is deposited directly on the stack support surface or the stack of lumber, or also to a preferably pivotable spacing-stick guide means arranged on the opposite side of the stack support surface.

A spacing-stick guide means of this kind ensures that a spacing stick is held substantially in its feed direction even in its terminal position, and that the subsequent depositing of said stick on the stack support surface or said lumber stack can be effected without risk of the spacing stick being wrongly positioned.

The invention also relates to a spacing stick feed means arranged adjacent a stack support surface for receiving layers of lumber.

Thus, there is arranged adjacent a stack support surface a spacing stick laying means having at least one laying device which moves either continuously or intermittently towards, over, and away from said stack support surface, said spacing stick laying means comprising means for feeding spacing sticks substantially parallel with the direction of return movement of said laying device, said engaging means being adapted to engage one end of a spacing stick in an engagement position located on the opposite side of the stack support surface relative to a position for the laying device in which said device engages a layer of lumber for transferring the spacing stick and said layer to the stack support surface whilst executing an at least partial, simultaneous oppositely directed relative movement with the layer of lumber and said spacing sticks at different levels.

The engaging means of said spacing stick laying means comprises, in accordance with a preferred embodiment, a clamping arm having a spring-loaded jaw part arranged, for example, to engage the rear end of said spacing stick to effect the advancement thereof. Such a gripping device can be of purely mechanical structure so as to operate automatically, suitably without the provision of particular ancillaries, such as hydraulic or pneumatic cylinders or like motors.

So that the invention will be more readily understood and further features thereof made apparent, and exemplary embodiments of the invention will now be described in detail with reference to the accompanying drawings.

FIG. 2 is a side view of the engaging and feeding means of the spacing-stick laying means shown in FIG. 1.

FIG. 3 is a plan view of the engaging and feeding means shown in FIG. 2.

FIGS. 6 and 7 are side views and plan views respectively of the engaging and feeding means in its inoperative, rearward position.

Figure 1:
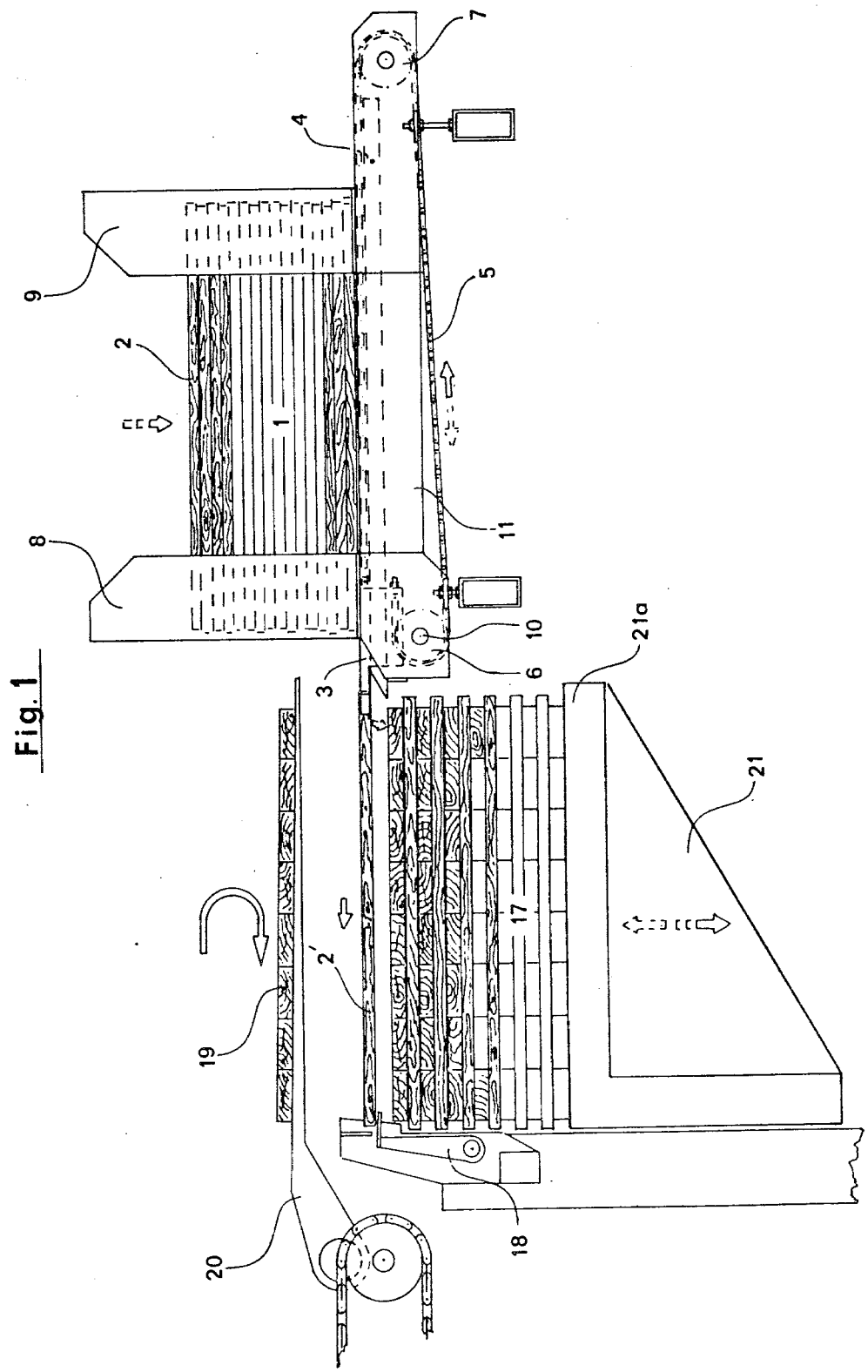
FIG. 1 is a partially schematic side view of a spacing-stick laying means having a horizontally movable gripping and feeding device, said device being shown in its operative feeding position.
Figure 5:
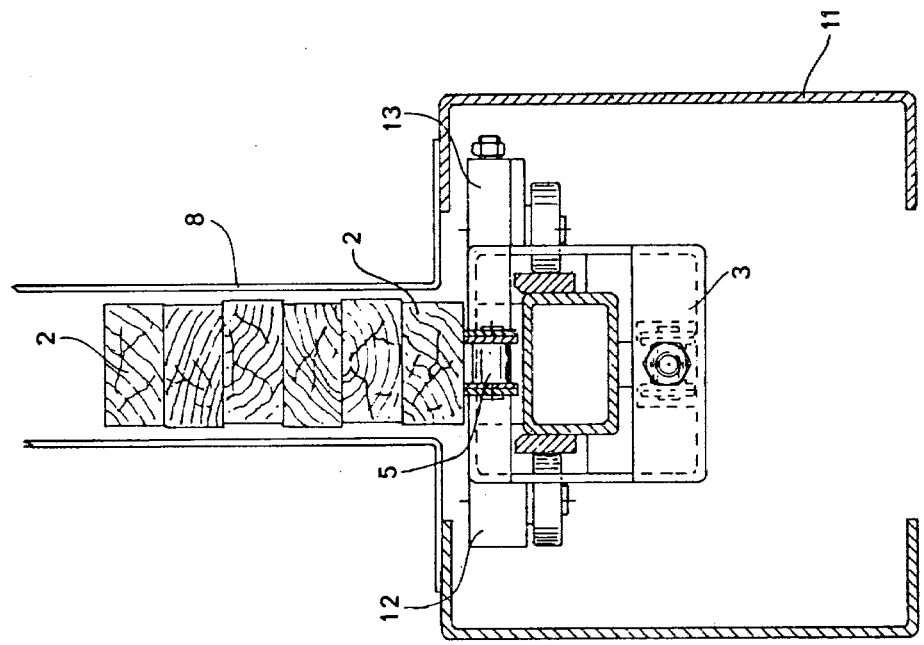
FIG. 5 illustrates the feed means from the rear in its active feeding position.
Figure 4:
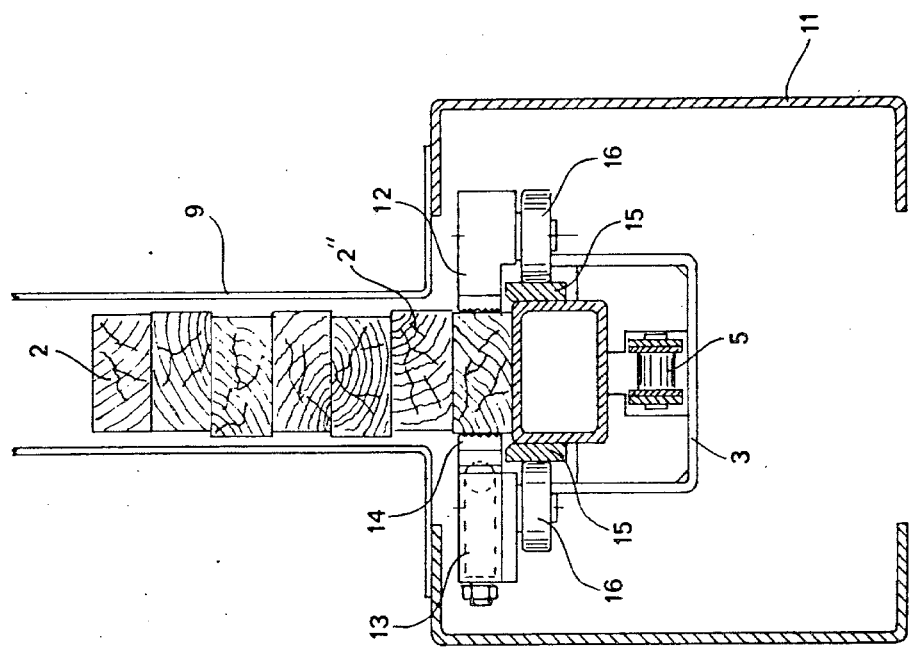
FIG. 4 illustrates the actual feed means in front view.

Although the following description is concerned with only one spacing stick feed means, and although only one such means is illustrated in the drawings, it will be understood that a plurality of feed means are placed along one side of the stack support surface, said laying means being connected to a common drive shaft (not shown).

The illustrated spacing stick feed means comprises a storage space 1 defined by a front wall 8 and a rear wall 9. Arranged in superimposed relationship in the storage space 1 are spacing sticks 2.

A feed means 3 is arranged for reciprocatory movement along a feed rail 4 and is fixed to a feed chain 5 which extends around a drive wheel 6 and a chain-guide wheel 7.

The forward and rearward walls 8 and 9 and the feed rail 4 are mounted on a frame structure 11, in which the drive wheel 6, a drive shaft 10 and the rear guide wheel 7 are journalled.

When the feed means 3 is moved forwards by the drive shaft 10 and the feed chain 5 from an inactive, rest position behind the storage space 1, a spacing stick 2' is fed into the feed means 3. The feed means 3 has a U-shaped jaw 12, having a pivotable clamping arm 13 mounted on a shaft 22, said clamping arm being in its open position.

In order to ensure that respective spacing sticks 2 are held firmly despite any variations in their width, the clamping arm 13 of the jaw 12 has a spring-loaded part 14, whose purpose is to take up any variations in the width of respective sticks.

Arranged on both sides of the rail 4 is a guide strip 15 whose purpose is to guide a spacing stick on the rail and, subsequent to said stick having been advanced through a given distance, to actuate guide rollers 16 arranged for the jaw 12 in a manner such that the spring-loaded part 14 of the clamping arm 13 firmly clamps the spacing stick as it is being advanced.

As the feed means 3 and the spacing stick 2' are moved forwardly, the lowermost spacing stick 2'' in the storage space 1 will rest on the part of the feed chain 5 located at the rear edge of the feed means 3. In this way, spacing sticks 2 lying above the stick 2'' are prevented from accompanying the spacing stick 2''.

The spacing stick laying means is arranged to cooperate with a stack support surface 21a arranged on a vertically moving lift arrangement 21. The spacing sticks are laid between separate layers 19 of lumber placed on the support surface by means of laying arms 20 which, in the illustrated embodiment, move continuously in an endless path. The laying arms 20 are arranged to cooperate with a wiper or doctor blade in a manner such as to remove said layers from said arms as said arms move rearwardly. Thus, the spacing sticks are inserted in a direction which is parallel with the direction of return movements of the laying arms. In this way, the feed means 4 moves on a level located beneath the level of the laying arm 20 during its forward movement towards the stack support surface 21a.

When the feed means 3 reaches an external stop position along the feed rail 4, the guide rollers 16 of the jaw means 12 will pass the end of the guide strips 15, whereupon the clamping arm 13 of the jaw means 12 opens and releases the spacing stick 2', the trailing edge of which falls down onto the stack of lumber 17 being formed.

The laying arm 20 can then deposit the layer of lumber 19 on to the thus placed spacing sticks. Subsequent hereto and after the laying arm 20 has been moved away from the stacking location, the pivotable spacing-stick guide means 18 is caused to swing away, the spacing sticks and the lumber layer falling down simultaneously on to the stack 17. The upper part of the spacing-stick guide means 18 will thus serve at the same time as a wiper for removing the layers of lumber located on the arm 20.

Upon completion of said feeding movement, the direction of rotation of the drive shaft 10 is reversed, thereby causing the feed means 3 to be moved back to its inactive rest position. When the feed means has passed the rear magazine wall 9, a further spacing stick falls down onto the feed rail 4.

Each time a layer of spacing sticks and lumber are placed on the stack, the support surface 21a is lowered through a distance corresponding to the sum of the thicknesses of the said layers of sticks and lumber.

Other kinds of engaging and feed means can be used within the scope of the invention. Thus, the respective spacing sticks can be engaged by means of suitably designed hydraulic or pneumatic cylinders. A particular advantage afforded by the illustrated embodiment, however, is that the provision of such ancillary devices is not necessary.

Movements of the spacing stick laying means and the stacking means need not necessarily be accurately synchronized. Since movement of the aforementioned means towards each other are effected at different levels, there is no risk of one of said means interfering with the other. The illustrated embodiment, in which both the spacing sticks and the layer of lumber falls simultaneously onto the stack support surface or onto a partially formed stack, is to be preferred, however, since it affords accurate control and guidance of the complete feeding operation. In this way it is possible to minimize the risk of oblique positioning of spacing sticks and layers of lumber, which may otherwise result in a wrongly formed stack.

I claim:

1. A method in the stacking of layers of lumber to form a stack by inserting spacing sticks between various lumber layers at right angles to the longitudinal axis of said layers, laying means carrying said lumber layers being arranged to move towards, over and away from a stack support surface on which the lumber layers are placed, and spacing sticks being inserted between separate lumber layers by movable means which feeds said spacing sticks substantially parallel with the direction of return movement of the laying means, wherein the movable means while engaging one end of a spacing stick feeds said stick towards the stack support layer substantially simultaneously with the movement of the laying means in a manner such that spacing sticks and lumber layers move in mutually opposite relative movements at different levels and out of contact with each other during at least part of a stacking sequence.

2. A method according to claim 1, characterized in that the spacing sticks are held substantially parallel with the feed direction when being fed by said means.

3. A method according to claim 1, wherein said spacing sticks are inserted beneath respective lumber layers during said substantially simultaneous mutually opposite movements.

4. A method according to claim 1, characterized in that the engaging means feed separate spacing sticks from an overlying magazine and maintain engagement with one end of respective spacing sticks until said engaging means has reached a remote turn position in which said spacing stick is deposited on a pivotable spacing-stick guide means on the opposite side of the stack support surface.

5. A spacing stick laying means arranged to cooperate with a stack support surface onto which layers of lumber are deposited by means of at least one laying means arranged for movement towards, over and away from said stack support surface, in which said spacing stick laying means comprises means arranged to feed respective spacing sticks substantially parallel with the direction of return movement of said laying means, characterized by engaging means arranged to engage one end of a spacing stick in an engagement position located on the opposite side of the stack support surface relative to a position for the laying means where said means engages a lumber layer for transferring the spacing stick and said lumber layer to the stack support surface while effecting at least partially a simultaneous mutually opposite relative movement with the lumber layer and the spacing sticks at mutually different levels.

6. A spacing stick laying means according to claim 5, characterized in that the engaging means comprises a clamping arm having spring-loaded jaw means for supporting a spacing stick during transfer of said stick to said stack support surface.

7. A spacing stick laying means according to claim 6, in which spacing sticks are stored in a magazine having a forward and a rearward defining wall, characterized in that the magazine is defined at the bottom thereof by a feed rail on each side of which there is arranged a guide strip adapted to guide a spacing stick on said rail and to activate guide rollers co-operating with said engaging means, in a manner such that said clamping arm activates said jaw means to clamp the spacing stick during the continued feed movement.

8. A spacing stick laying means according to claim 7, characterized in that there is provided on the opposite side of said stack support surface a spacing-stick guide means for supporting the leading edge of a fed spacing stick.

9. A spacing stick laying means according to claim 8, characterized in that said guide means is pivotable in a downwards direction.

10. A spacing stick laying means according to claim 9, characterized in that a plurality of engaging means are arranged to co-operate with a respective chain which extends over terminal wheels; and that at least two terminal wheels arranged in line with each other are provided for driving a common drive shaft.

11. A spacing stick laying means according to claim 9, characterized in that part of the spacing stick guide means is arranged to serve as a wiper for depositing layers of lumber from said laying means onto said stack support surface or onto a partly formed stack.

* * * * *